US012073988B2

(12) United States Patent
Lee

(10) Patent No.: US 12,073,988 B2
(45) Date of Patent: Aug. 27, 2024

(54) COIL COMPONENT

(71) Applicant: SAMSUNG ELECTRO-MECHANICS CO., LTD., Suwon-si (KR)

(72) Inventor: Han Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 664 days.

(21) Appl. No.: 17/213,807

(22) Filed: Mar. 26, 2021

(65) Prior Publication Data

US 2022/0189685 A1 Jun. 16, 2022

(30) Foreign Application Priority Data

Dec. 10, 2020 (KR) ........................ 10-2020-0172519

(51) Int. Cl.
*H01F 27/32* (2006.01)
*H01F 17/00* (2006.01)
*H01F 27/29* (2006.01)

(52) U.S. Cl.
CPC ....... *H01F 27/324* (2013.01); *H01F 17/0013* (2013.01); *H01F 27/292* (2013.01); *H01F 2017/002* (2013.01)

(58) Field of Classification Search
CPC .. H01F 27/324; H01F 17/0013; H01F 27/292; H01F 2017/002
See application file for complete search history.

(56) References Cited

U.S. PATENT DOCUMENTS

2002/0152611 A1* 10/2002 Tung .................... H05K 3/4602 29/846
2003/0080408 A1* 5/2003 Farnworth ........ H01L 21/76898 257/E21.597
2009/0002111 A1* 1/2009 Harrison ............... H01F 41/046 336/96
2011/0291788 A1* 12/2011 Dalmia ............... H01F 27/2804 336/200
2013/0027172 A1* 1/2013 Kuo .......................... H01F 5/00 336/200

(Continued)

FOREIGN PATENT DOCUMENTS

JP 2003-46242 A 2/2003
KR 10-1681409 B1 12/2016

*Primary Examiner* — Malcolm Barnes
(74) *Attorney, Agent, or Firm* — MORGAN, LEWIS & BOCKIUS LLP

(57) ABSTRACT

A coil component, includes: a body including an insulating substrate and a coil portion disposed on the insulating substrate, wherein the coil portion includes first and second upper patterns disposed on one surface of the insulating substrate to be spaced apart from each other, first and second lower patterns disposed on the other surface of the insulating substrate to be spaced apart from each other, and first and second vias each penetrating through the insulating substrate and disposed to be adjacent to each other. An area of one end portion of the first via, in contact with the first upper pattern is smaller than an area of one end portion of the second via, in contact with the second upper pattern, and an area of the other end portion of the first via is greater than an area of the other end portion of the second via.

20 Claims, 7 Drawing Sheets

I - I'

(56) References Cited

U.S. PATENT DOCUMENTS

| | | | | |
|---|---|---|---|---|
| 2013/0037944 | A1* | 2/2013 | Lee | H01L 24/17 257/737 |
| 2015/0200049 | A1* | 7/2015 | Kim | H01F 27/2804 336/200 |
| 2016/0307686 | A1* | 10/2016 | Moon | H01F 27/255 |
| 2018/0096780 | A1* | 4/2018 | Sekiguchi | H01F 27/2804 |
| 2018/0130595 | A1* | 5/2018 | Choi | H01F 17/0013 |
| 2020/0221577 | A1* | 7/2020 | Chavali | H05K 3/0047 |

* cited by examiner

I - I'

COIL COMPONENT

CROSS-REFERENCE TO RELATED APPLICATION(S)

The present application claims the benefit of priority to Korean Patent Application No. 10-2020-0172519, filed on Dec. 10, 2020 in the Korean Intellectual Property Office, the disclosure of which is incorporated herein by reference in its entirety.

TECHNICAL FIELD

The present disclosure relates to a coil component.

BACKGROUND

With the miniaturization and increased on levels of performance of electronic devices, miniaturization and high performance are also required for coil components used in electronic devices. That is, the coil component is gradually miniaturized, and even in this case, component characteristics such as inductance (Ls) and Q characteristics (Quality factor) need to be secured.

Meanwhile, in order to increase the Q characteristics, the number of turns of the coil must be increased, but there is a limitation in increasing the number of turns of the coil according to the miniaturization of components.

SUMMARY

An aspect of the present disclosure is to provide a coil component having improved Q characteristics.

According to an aspect of the present disclosure, a coil component includes: a body including an insulating substrate having a first surface and a second surface opposing each other, and a coil portion disposed on the insulating substrate. The coil portion includes first and second upper patterns disposed on the first surface of the insulating substrate to be spaced apart from each other, first and second lower patterns disposed on the second surface of the insulating substrate to be spaced apart from each other, and first and second vias penetrating through the insulating substrate and disposed to be spaced apart from each other. An area of an upper end portion of the first via, in contact with the first upper pattern is smaller than an area of an upper end portion of the second via, in contact with the second upper pattern, and an area of a lower end portion of the first via is greater than an area of a lower end portion of the second via.

According to another aspect of the present disclosure, a coil component includes: a body including an insulating substrate having a first surface and a second surface opposing each other; and a coil portion disposed on the insulating substrate. The coil portion comprises a plurality of upper patterns disposed on the first surface of the insulating substrate to be spaced apart from one another in a first direction, a plurality of lower patterns disposed on the second surface of the insulating substrate to be spaced apart from one another, and a plurality of vias penetrating through the insulating substrate and each having an upper end portion and a lower end portion that oppose each other. The plurality of vias includes a via having a tapered cross-section and a via having an inverse tapered cross-section alternatively disposed in the first direction.

According to another aspect of the present disclosure, a coil component includes: a body including an insulating substrate having a first surface and a second surface opposing each other; and a coil portion disposed on the insulating substrate. The coil portion comprises first and second upper patterns disposed on the first surface of the insulating substrate to be spaced apart from each other in a first direction, first and second lower patterns disposed on the second surface of the insulating substrate to be spaced apart from each other, and first and second vias each penetrating through the insulating substrate and disposed to be adjacent to each other in the first direction. A cross-sectional area of an upper end portion of the first via in contact with the first upper pattern is smaller than a cross-sectional area of an upper end portion of the second via in contact with the second upper pattern. A cross-sectional area of the upper end portion of the first via is smaller than a cross-sectional area of the lower end portion of the first via.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
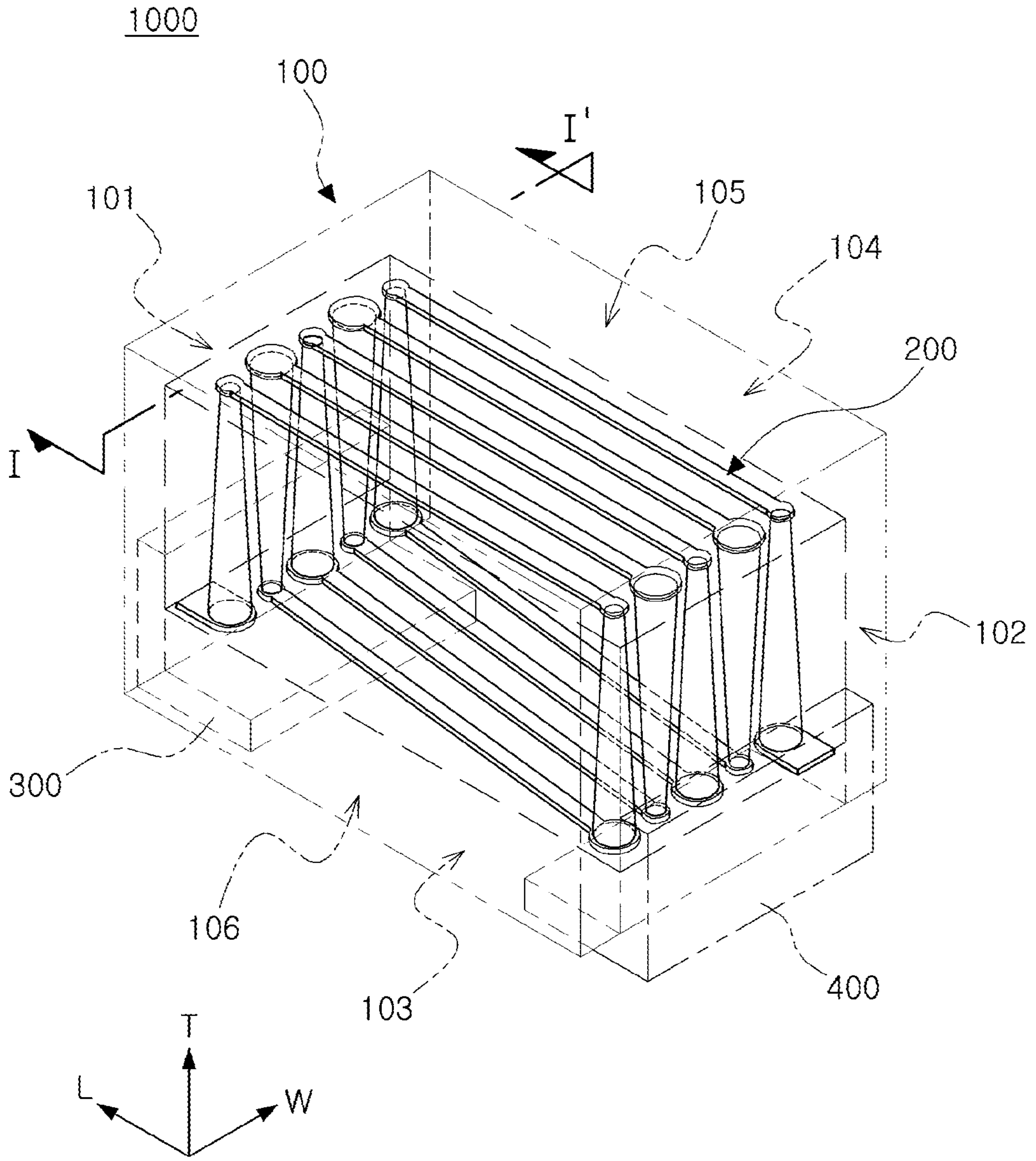
FIG. 1 is a perspective diagram schematically illustrating a coil component according to an embodiment of the present disclosure.

Hereinafter, embodiments of the present disclosure will be described as follows with reference to the attached drawings. The terms used in the exemplary embodiments are used to simply describe an exemplary embodiment, and are not intended to limit the present disclosure. A singular term includes a plural form unless otherwise indicated. The terms, “include,” “comprise,” “is configured to,” etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term “disposed on,” “positioned on,” and the like, may indicate that an element is positioned on or beneath an object, and does not necessarily mean that the element is positioned on the object with reference to a gravity direction.

The term “coupled to,” “combined to,” and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

In the descriptions described with reference to the accompanied drawings, the same elements or elements corresponding to each other will be described using the same reference numerals, and overlapped descriptions will not be repeated.

In electronic devices, various types of electronic components may be used, and various types of coil components may be used between the electronic components to remove noise, or the like.

In other words, in electronic devices, a coil component may be used as a power inductor, a high frequency (HF) inductor, a general bead, a high frequency (GHz) bead, a common mode filter, and the like.

Figure 2:
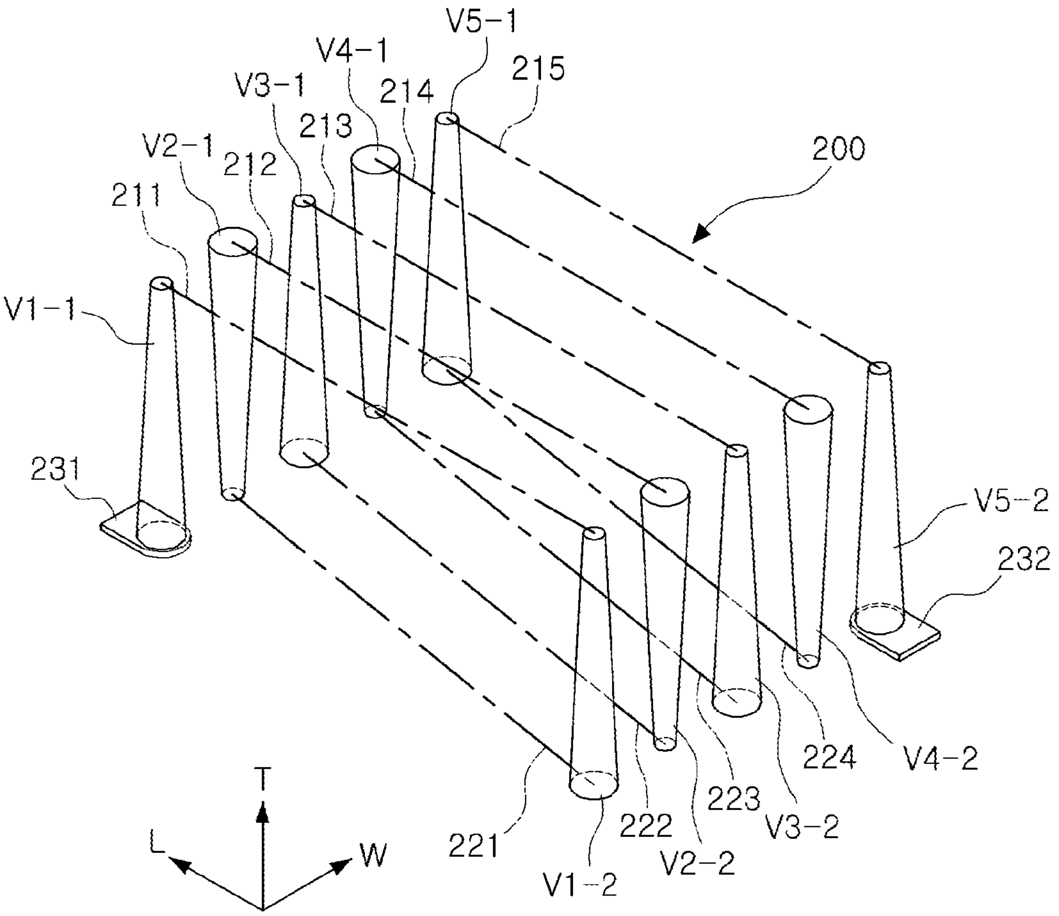
FIG. 2 is a diagram schematically illustrating a connection relationship of a coil portion.
Figure 3:
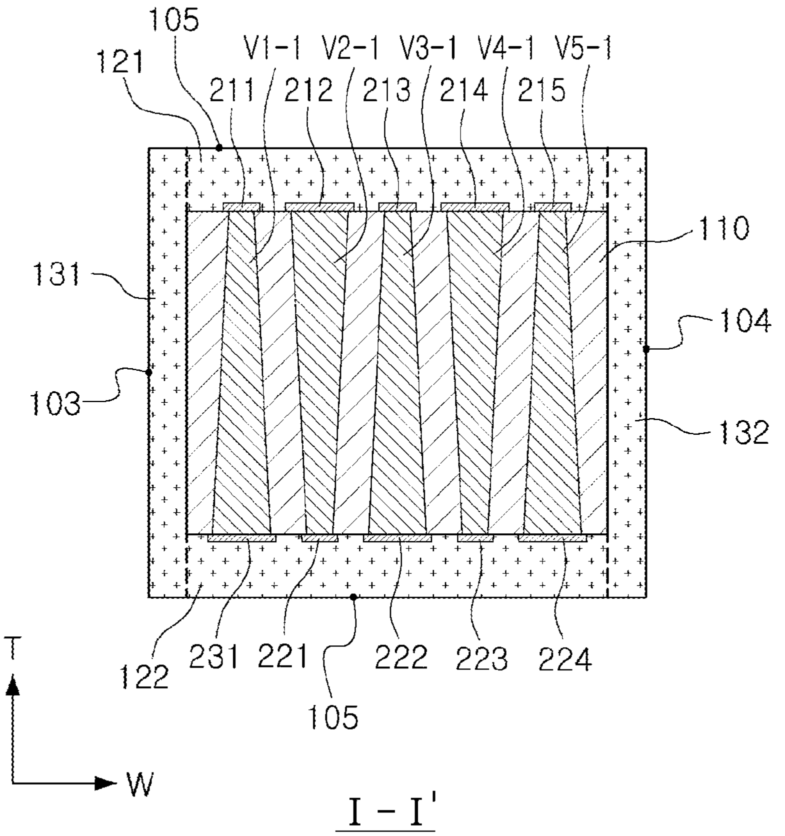
FIG. 3 is a diagram illustrating a cross-section taken along line I-I' of FIG. 1.
Figure 4:
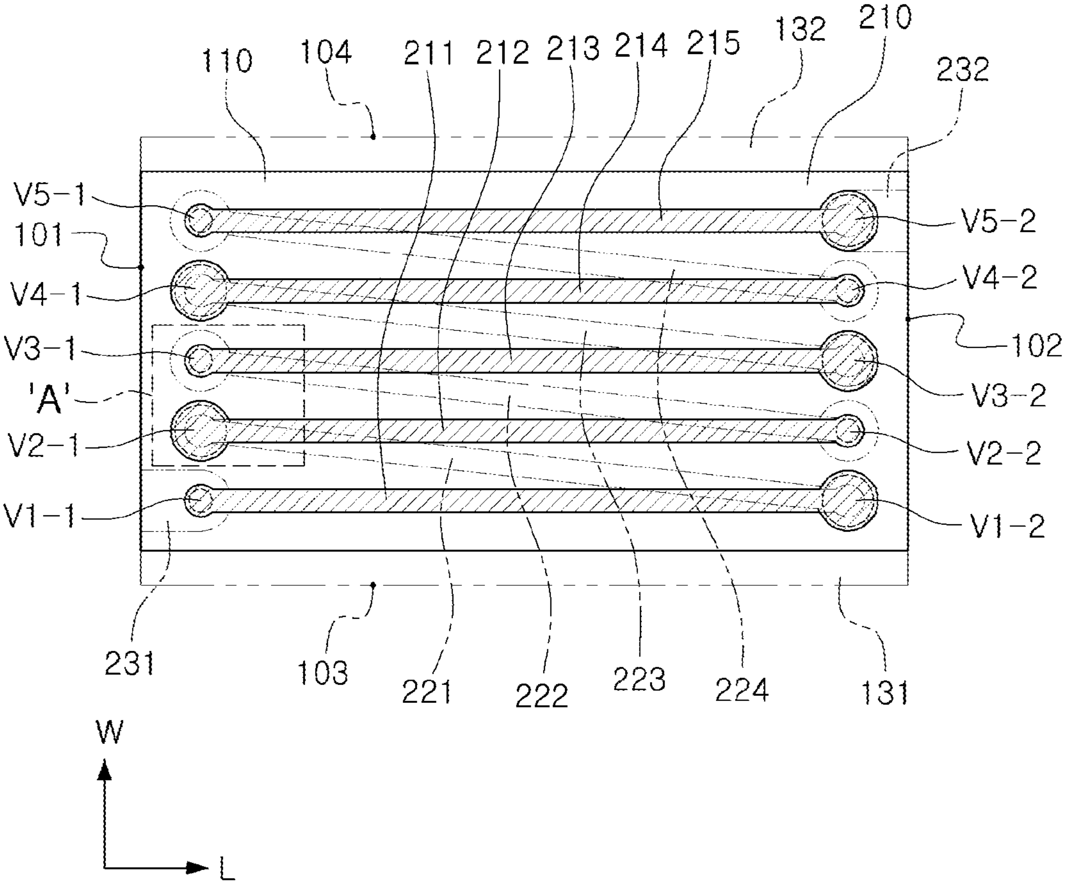
FIG. 4 is a diagram schematically illustrating the view from above of FIG. 1.
Figure 5:
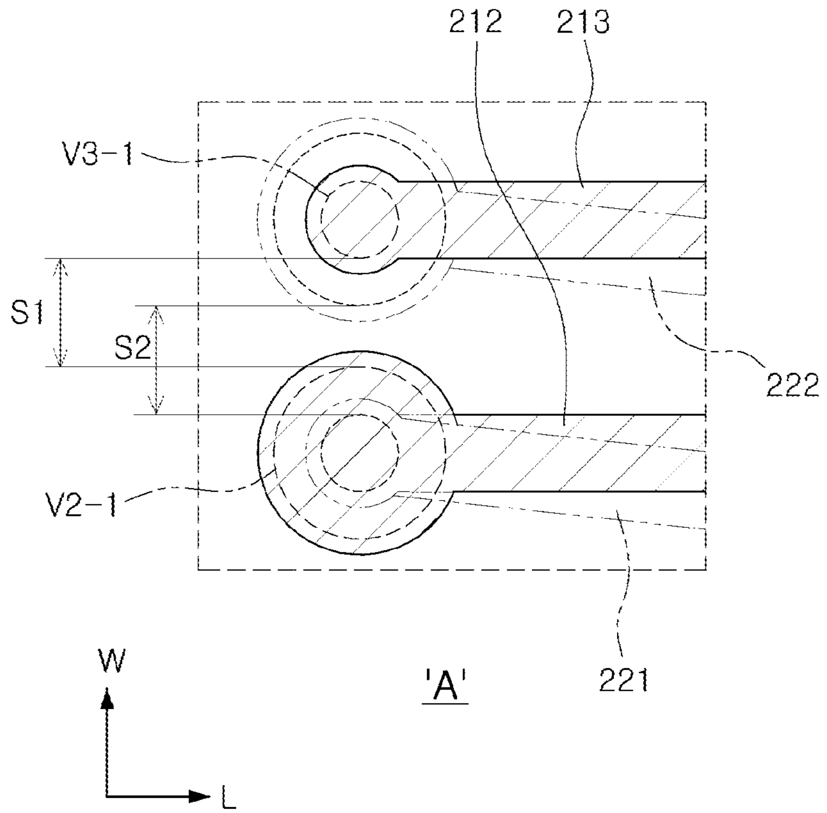
FIG. 5 is a diagram illustrating an enlarged view of A in FIG. 4.

FIG. 1 is a perspective diagram schematically illustrating a coil component according to an embodiment of the present disclosure. FIG. 2 is a diagram schematically illustrating a connection relationship of a coil portion. FIG. 3 is a diagram illustrating a cross-section taken along line I-I' of FIG. 1. FIG. 4 is a diagram schematically illustrating the view from above of FIG. 1. FIG. 5 is a diagram illustrating an enlarged view of A in FIG. 4. Meanwhile, FIG. 4 illustrates the coil portion projected from the upper portion of FIG. 1 to reveal the structure of the coil portion more clearly.

Referring to FIGS. 1 to 5, a coil component 1000 according to an embodiment of the present disclosure may include a body 100, a coil portion 200, and external electrodes 300 and 400.

The body 100 may form an exterior of the coil component 1000 according to the present embodiment, and the coil portion 200 is embedded therein.

The body 100 may have a hexahedral shape overall.

Based on FIG. 1, the body 100 includes a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. In the description below, two end surfaces (a first end surface and a second end surface) of the body 100 may refer to the first surface 101 and the second surface 102 of the body 100, and two side surfaces (a first side surface and a second side surface) of the body 100 may refer to the third surface 103 and the fourth surface 104 of the body 100. In addition, one surface of the body 100 may refer to the sixth surface 106 of the body 100, and the other surface of the body 100 may refer to the fifth surface 105 of the body 100. The sixth surface 106 of the body 100 may be used as a mounting surface when the coil component 1000 according to the present embodiment is mounted on a mounting substrate such as a printed circuit board.

For example, the body 100 may be formed such that the coil component 1000 according to the present embodiment in which external electrodes 400 and 500 to be described later may be formed to have a length of 1.0 mm, a width of 0.5 mm, and a thickness of 0.6 mm, or have a length of 1.6 mm, a width of 0.8 mm, and a thickness of 1.0 mm, or have a length of 0.4 mm, a width of 0.2 mm, and a thickness of 0.23 mm, but is not limited thereto. Meanwhile, since the dimensions described above are merely dimensions on design that do not reflect process errors and the like, it should be considered that they are within the scope of the present disclosure to the extent that process errors may be recognized.

The length of the coil component 1000 may refer to a maximum value, among dimensions of a plurality of line segments, connecting two outermost boundary lines of the coil component 1000 opposing in a length (L) direction, illustrated in the cross-sectional image, and parallel to a length (L) direction of the coil component 1000, with reference to an image for a cross-section of the coil component 1000 in a length (L) direction (L)–a thickness (T) direction in a central portion of the coil component 1000 in a width direction (W), obtained by an optical microscope or a scanning electron microscope (SEM). Alternatively, the length of the coil component 1000 described above may refer to an arithmetic mean value of at least two dimensions, among a plurality of line segments connecting two outermost boundary lines of the coil component 1000 opposing in the length (L) direction illustrated in the cross-sectional image, and parallel to the length (L) direction of the coil component 1000.

The thickness of the coil component 1000 described above may refer to a maximum value, among dimensions of a plurality of line segments, connecting an outermost boundary line of the coil component 1000 illustrated in the cross-sectional image, and parallel to a thickness(T) direction of the coil component 1000, with reference to an image for a cross-section of the coil component 1000 in a length (L) direction–a thickness (T) direction in a central portion of the coil component 1000 in a width direction (W), obtained by an optical microscope or a scanning electron microscope (SEM). Alternatively, the thickness of the coil component 1000 described above may refer to an arithmetic mean value of at least two dimensions, among a plurality of line segments connecting an outermost boundary line of the coil component 1000 illustrated in the cross-sectional image, and parallel to the thickness (T) direction of the coil component 1000.

The width of the coil component 1000 described above may refer to a maximum value, among dimensions of a plurality of line segments, connecting an outermost boundary line of the coil component 1000 illustrated in the cross-sectional image, and parallel to the width (W) direction of the coil component 1000, with reference to an image for a cross-section of the coil component 1000 in a length (L) direction-a thickness (T) direction in a central portion of the coil component 1000 in a width (W) direction, obtained by an optical microscope or a scanning electron microscope (SEM). Alternatively, the width of the coil component 1000 described above may refer to an arithmetic mean value of at least two dimensions, among a plurality of line segments, connecting an outermost boundary line of the coil component 1000 illustrated in the cross-sectional image, and parallel to the width (W) direction of the coil component 1000.

Alternatively, each of the length, the width, and the thickness of the coil component 1000 may be measured by a micrometer measurement method. The micrometer measurement method may measure sizes by setting a zero point using a Gage repeatability and reproducibility (R&R) micrometer, inserting the coil component 1000 according to the present embodiment into a space between tips of the micrometer, and turning a measurement lever of the micrometer. Meanwhile, when the length of the coil component 1000 is measured by the micrometer measurement method, the length of the coil component 1000 may refer to a value measured one time, or may refer to an arithmetic means of values measured multiple times. The same configuration may also be applied to the width and the thickness of the coil component 1000.

The body 100 may include an insulating substrate 110, an upper cover layer 121 and a lower cover layer 122 disposed on both surfaces of the insulating substrate 110 opposing each other in the thickness direction T, respectively, and side surface cover layers 131 and 132 disposed on both side surfaces of the insulating substrate 110 opposing each other in the width direction W, respectively.

On the insulating substrate 110, a coil portion 200 to be described later may be disposed therein, and the insulating substrate 110 may be a base substrate in forming the coil portion 200. The insulating substrate 110 may be, for example, at least one of a ceramic substrate such as alumina ($Al_2O_3$), a glass substrate such as a glass plate, and a resin substrate including a glass cloth. As an example, the insulating substrate 110 may include a copper clad laminate (CCL), but the scope of the present disclosure is not limited thereto. The thickness of the insulating substrate 110 may be, for example, 10 μm or more and 50 μm or less, but is not limited thereto.

Based on the direction of FIG. 3, the upper cover layer 121 and the lower cover layer 122 may be disposed on the upper and lower surfaces of the insulating substrate 110, respectively, to cover upper patterns 211, 212, 213, 214, and 215 and lower patterns 221, 222, 223, and 224 respectively disposed on the upper and lower surfaces of the insulating substrate 110. Based on the direction of FIG. 3, the side surface cover layers 131 and 132 may be disposed on left and right side surfaces of the insulating substrate 110, respectively, to cover the left and right side surfaces of the insulating substrate 110. In the present embodiment, the fifth and sixth surfaces 105 and 106 of the body 100 may be comprised of the upper cover layer 121 and the lower cover layer 122, and the third and fourth surfaces 103 and 104 of the body 100 may be comprised of the side surface cover layers 131 and 132. That is, the insulating substrate 110 may not be exposed to the third to sixth surfaces 103, 104, 105, and 106 of the body 110, and may only exposed to the first and second surfaces 101 and 102 of the body 100. Meanwhile, as shown in FIG. 3, the side surface cover layers 131 and 132 may cover the left and right side surfaces of each of the upper cover layer 121 and the lower cover layer 122, but this is merely an example. Therefore, the dispositional relationship of the upper cover layer 121 and the lower cover layer 122 and the side surface cover layers 131 and 132 may be variously modified. As another example, when the side surface cover layers 131 and 132 are first formed on the insulating substrate 110, the upper cover layer 121 may be formed to cover all of the upper surface of each of the first and second side surface cover layers 131 and 132. As another example, the side surface cover layers 131 and 132 may be selectively deleted in the present disclosure.

Each of the upper cover layer 121, the lower cover layer 122, and the side surface cover layers 131 and 132 may include an insulating material including a thermosetting insulating resin such as an epoxy resin, a thermoplastic insulating resin such as a polyimide, or a photosensitive insulating resin, or may be formed of an insulating further including at least one of glass fibers, inorganic fillers, and organic fillers dispersed in the insulating resin. For example, the upper cover layer 121 may include an insulating material such as prepreg, Ajinomoto Build-up Film (ABF), FR-4, a bismaleimide triazine (BT) resin, a photoimageable dielectric (PID), and the like, but is not limited thereto.

As an inorganic filler, at least one or more elements selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

The organic filler may include, for example, at least one of acrylonitrile-butadiene-styrene (ABS), cellulose acetate, nylon, polymethyl methacrylate (PMMA), poly benzimidazole, polycarbonate, polyether sulfone, Polyetherether ketone (PEEK), polyetherimide (PEI), polyethylene, polylactic acid acid, polyoxymethylene, polyphenylene oxide, polyphenylene sulfide, polypropylene, polystyrene, polyvinyl chloride, ethylene vinyl acetate, ethylene vinyl acetate), polyvinyl alcohol, polyethylene oxide, epoxy, and polyimide.

Each of the upper cover layer 121, the lower cover layer 122, and the side surface cover layers 131 and 132 may be formed by laminating an insulating film, or may be formed by coating an insulating paste and then curing it, but is limited thereto.

Relative magnetic permeability ($\mu_r$) of each of the insulating substrate 110, the upper cover layer 121, the lower cover layer 122, and the side surface cover layers 131 and 132 may be lower than 1. In this case, since the relative magnetic permeability (μr) of the entire body 100 may be lower than 1, the coil component 1000 according to the present embodiment may be used as a high frequency inductor (HF inductor).

The coil portion 200 may be disposed on the insulating substrate 110. Specifically, the coil portion 200 may be disposed on the insulating substrate 110 and embedded in the body 100 to exhibit characteristics of the coil component. For example, when the coil component 1000 according to the present embodiment is used as a power inductor, the coil portion 200 may serve to stabilize power supply of electronic devices by storing an electric field as a magnetic field and maintaining an output voltage.

The coil portion 200 may include upper patterns 211, 212, 213, 214, and 215 disposed on a first surface (e.g., upper surface) of the insulating substrate 110 to be spaced apart from each other, lower patterns 221, 222, 223, and 224 disposed on a second surface (e.g., lower surface) of the insulating substrate 110 to be spaced apart from each other, and vias V1-1, V2-1, V3-1, V4-1, V5-1, V1-2, V1-2, V2-2, V3-2, V4-2, and V5-2 penetrating through the insulating substrate 110 and disposed to be spaced apart from each other.

Specifically, referring to FIG. 2, based on the reference directions shown in FIG. 2, the vias V1-1, V2-1, V3-1, and V4-1, and V5-1, disposed on one of two sections of the insulating substrate 110 opposing in the length direction L, may be disposed to be spaced apart from each other in the width direction W. The vias V1-2, V2-2, V3-2, V4-2, and V5-2, disposed on the other section of the two sections of the insulating substrate 110 opposing in the length direction L, may be disposed to be spaced apart from each other in the width direction W. The upper patterns 211, 212, 213, 214, and 215 may be disposed on the upper surface of the insulating substrate 110 to be spaced apart from each other in the width direction W, and each of the upper patterns 211, 212, 213, 214, and 215 extending in the length direction L may have first and second ends opposing each other in the length direction L. The lower patterns 221, 222, 223, and 224 may be disposed on the lower surface of the insulating substrate 110 to be spaced apart from each other, and each of the lower patterns 221, 222, 223, and 224 extending in one direction may have first and second ends opposing each other in the one direction. In the V1-1 via, a first end portion (an upper end portion) is connected to be in contact with the first end of the first upper pattern 211, and a second end portion (a lower end portion) is connected to be in contact with the first lead-out pattern 231. In the via V1-2, a first end portion (an upper end portion) is connected to be in contact with the second end of the first upper pattern 211, and a second end portion (a lower end portion) is connected to be in contact with the second end of the first lower pattern 221. In the via V2-1, a first end portion (an upper end portion) is connected to be in contact with the first end of the second upper pattern 212, and a second end portion (a lower end portion) is connected to be in contact with the first end of the first lower pattern 221. In the V2-2 via, a first end portion (an upper end portion) is connected to be in contact with the second end of the second upper pattern 212, and a second end portion (a lower end portion) is connected to be in contact with the second end of the second lower pattern 222. In the via V3-1, a first end portion (an upper end portion) is connected to be in contact with the first end of the third upper pattern 212, and a second end portion (a lower end portion) is connected to be in contact with the first end of the second lower pattern 222. In the V3-2 via, a first end portion (an upper end portion) is connected to be in contact with the second end of the third upper pattern 213, and a second end portion (a lower end portion) is connected to be in contact with the second end of the third lower pattern 223. In the via V4-1, a first end portion (an upper end portion) is connected to be in contact with the first end of the fourth upper pattern 214, and a second end portion (a lower end portion) is connected to be in contact with the first end of the third lower pattern 223. In the V4-2 via, a first end portion (an upper end portion) is connected to be in contact with the second end of the fourth upper pattern 214, and a second end portion (a lower end portion) is connected to be in contact with the second end of the fourth lower pattern 224. In the via V5-1, a first end portion (an upper end portion) is connected to be in contact with the first end of the fifth upper pattern 215, and a second end portion (a lower end portion) is connected to be in contact with the first end of the fourth lower pattern 224. In the V5-2 via, a first end portion (an upper end portion) is connected to be in contact with the second end of the fifth upper pattern 215, and a second end portion (a lower end portion) is connected to be in contact with the second lead pattern 232. The first lead-out pattern 231 may be exposed to the first surface 101 of the body 100 to be connected to the first external electrode 300 to be described later. The second lead-out pattern 232 may be exposed to the second surface 102 of the body 100 to be connected to the second external electrode 400 to be described later. Thereby, the upper patterns 211, 212, 213, 214 and 215, the lower patterns 221, 222, 223, and 224, and the vias V1-1, V2-1, V3-1, V4-1, V5-1, V1-2, V2-2, V3-2, V4-2, and V5-2 can function as a single solenoid coil connected in series between the first external electrode 300 and the second external electrode 400.

Two of the vias V1-1, V2-1, V3-1, V4-1, V5-1, V1-2, V2-2, V3-2, V4-2, and V5-2, disposed to be adjacent with each other may be formed in a form complementary to each other. As an example, an area of the first end portion of the via V1-1, in contact with the first end of the first upper pattern 211 may be smaller than an area than an area of the first end portion of the via V2-1, in contact with the first end of the second upper pattern 212, and an area of the second end portion of the via V1-1 may be greater than an area of the second end portion of the via V2-1. In addition, a cross-sectional area of the via V1-1 may increase from the first end portion to the second end portion, and a cross-sectional area of the via V2-1 via may decrease from the first end portion to the second end portion. That is, the vias V1-1 and V2-1 disposed to be adjacent to each other in the width direction W on the insulating substrate 110, may be formed in a tapered shape and an inverted tapered shape, respectively.

A plurality of vias formed in a single component may be formed by processing a via hole for forming a via on an insulating substrate and then filling the via hole with a conductive material. Conventionally, all of the plurality of via holes may be processed and disposed on the upper surface of the insulating substrate while having a tapered shape, or all of the plurality of via holes may be processed and disposed on the lower surface of the insulating substrate while having an inverted tapered shape. As an example, when all of the plurality of via holes have a tapered shape, a maximum diameter of all via holes may be disposed on the upper surface of the insulating substrate, such that the number of via holes that can be formed may be inevitably reduced, based on a dimension in the width direction W of the upper surface of the same insulating substrate. In the present embodiment, when the plurality of vias are disposed in the width direction W, the above-described problem may be solved by alternately disposing the via having a tapered cross-section and the via having an inverted tapered cross-section. That is, based on the width of the same insulating substrate 110, unlike in the related art, a greater number of via holes and vias may be formed. As a result, a larger number of upper patterns can be formed, based on an area of one surface of the same insulating substrate 110, so that the total number of turns of the coil portion 200 can be increased.

Referring to FIG. 5, a spacing distance S1 between the lower end portion of the via V2-1 and the lower end portion of the via V3-1 may be substantially equal to a spacing distance S2 between the upper end portion of the via V2-1 and the upper end portion of the via V3-1. The via V2-1 having an inverse tapered cross-section and the via V3-1 having a tapered cross-section may be disposed to be adjacent to each other in the width direction W, and by allowing a spacing distance S1 between the upper end portions of the via V2-1 and the via V3-1 and a spacing distance S2 between the lower end portions of the V2-1 and V3-1 to be substantially equal to each other, a larger number of vias may be disposed based on the same cross-sectional area of the insulating substrate 110.

Meanwhile, in the descriptions above, the description was illustrated based on the V2-1 via and the V3-1 via, but the same description described above may also be applied to other vias disposed to be adjacent to each other in the width direction W shown in FIG. 2 and the upper and lower patterns connecting the vias.

At least one of the upper patterns 211, 212, 213, 214, and 215, the lower patterns 221, 222, 223, and 224, the vias V1-1, V2-1, V3-1, V4-1, V5-1, V1-2, V2-2, V3-2, V4-2, and V5-2) and the lead-out patterns 231 and 232 may include one or more conductive layers. For example, when the upper patterns 211, 212, 213, 214, and 215 and the vias V1-1, V2-1, V3-1, V4-1, V5-1, V1-2, V2-2, V3-2, V4-2, and V5-2 are disposed on the upper surface of the insulating substrate 110 by plating, the upper patterns 211, 212, 213, 214, and 215 and the vias V1-1, V2-1, V3-1, V4-1, V5-1, V1-2, V2-2, V3-2, V4-2, and V5-2 may include a first conductive layer formed by vapor deposition such as electroless plating or sputtering, respectively, a second conductive layer disposed on the first conductive layer. The first conductive layer may be a seed layer for forming a second conductive layer on the insulating substrate 110 by plating. The second conductive layer may be an electroplating layer. Here, the electroplating layer may have a single layer structure or a multilayer structure. The electroplating layer with a multilayer structure may have a conformal film structure in which one electroplating layer is covered by the other electroplating layer, and may have a form in which the other electroplating layer is laminated only on one side of one electroplating layer. The seed layer of the upper patterns 211, 212, 213, 214, and 215 and the seed layer of the vias V1-1, V2-1, V3-1, V4-1, V5-1, V1-2, V2-2, V3-2, V4-2, and V5-2 may be integrally formed, such that boundaries therebetween may not be formed, but is not limited thereto.

Each of the upper patterns 211, 212, 213, 214, and 125, the lower patterns 221, 222, 223, and 224, the vias V1-1, V2-1, V3-1, V4-1, V5-1, V1-2, V2-2, V3-2, V4-2, and V5-2, and the lead-out patterns 231 and 232 may include a conductive material such as copper (Cu), aluminum (Al), silver (Ag), tin (Sn), gold (Au), nickel (Ni), lead (Pb), titanium (Ti), or an alloy thereof, but is not limited thereto.

The first and second external electrodes 300 and 400 are disposed on the sixth surface 106 of the body 100 to be spaced apart from each other. Each of the first and second external electrodes 300 and 400 extend onto the first and second surfaces 101 and 102 of the body 100, respectively, and is connected to be in contact with the lead-patterns 231 and 232 exposed to the first and second surfaces 101 and 102 of the body 100, respectively.

The first and second external electrodes 300 and 400 may be formed to have a single layer structure or a multilayer structure. For example, each of the first and second external electrodes 300 and 400 may include a first layer including copper (Cu), a second layer disposed on the first layer and including nickel (Ni), and a third layer disposed on the second layer and including tin (Sn). The first and second external electrodes 300 and 400 may be formed by a plating method, a paste printing method, or the like. As a non-limiting example, each of the first and second external electrodes may include a first layer formed by directly applying a conductive paste containing conductive powder to a body and curing or sintering the first layer, and a second layer formed by electroplating by using the first layer as a seed layer.

The first and second external electrodes 300 and 400 may include a conductive material of copper (Cu), aluminum (Al), silver (Ag), tin (Sn), gold (Au), nickel (Ni), lead (Pb), and chromium(Cr), titanium (Ti), or an alloy thereof, but is not limited thereto.

The coil component 1000 according to the present embodiment, for example, vias V1-1 having a tapered cross-sectional shape and vias V2-1 having an inverted tapered cross-sectional shape are disposed to be adjacent to each other in the width direction W. As a result, a larger number of vias may be disposed for the same width of the insulating substrate 110. Accordingly, the coil component 1000 according to the present embodiment may increase the total number of turns of the coil portion 300, such that Q characteristics and inductance characteristics Ls may be improved.

Figure 6:
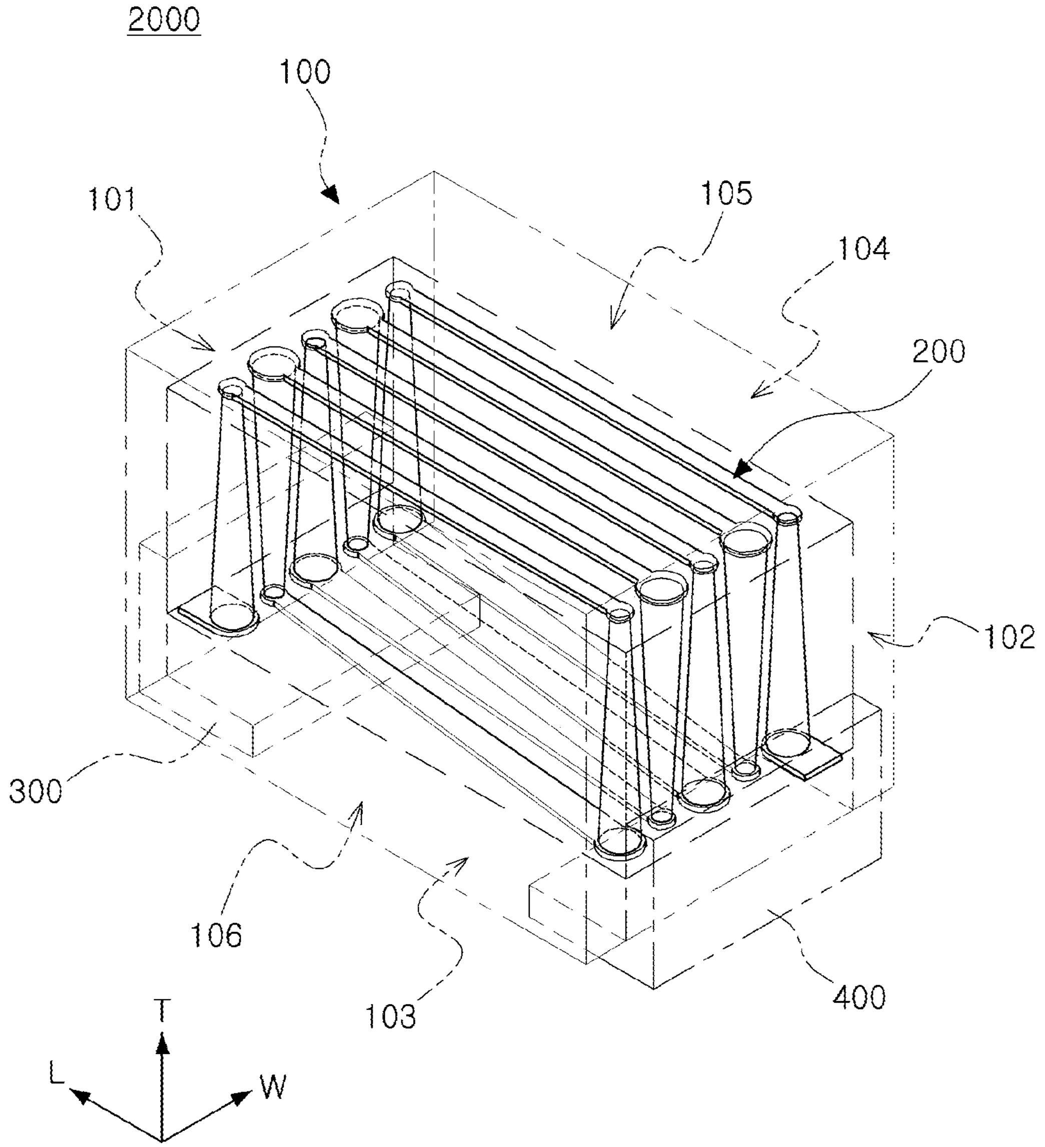
FIG. 6 is a diagram schematically illustrating a coil component according to another embodiment of the present disclosure.
Figure 7:
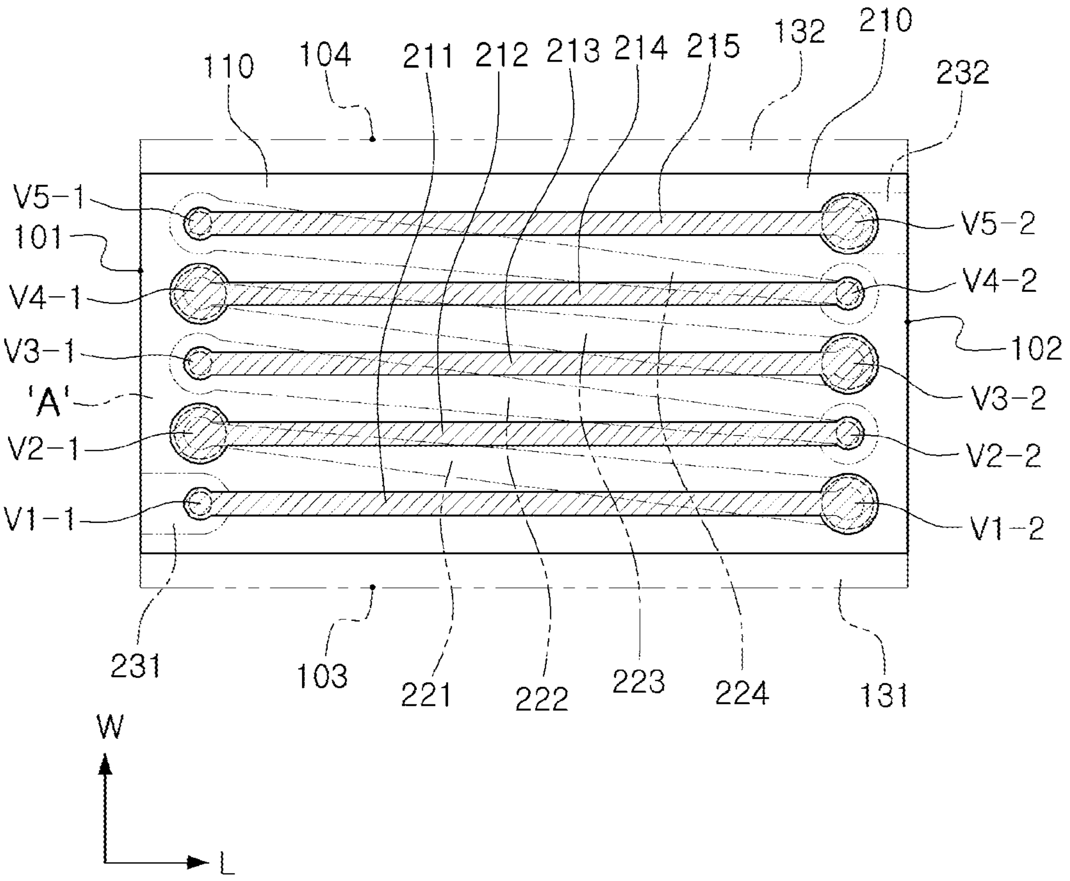
FIG. 7 is a schematic diagram of FIG. 6 as viewed from above.

FIG. 6 is a diagram schematically illustrating a coil component according to another embodiment of the present disclosure. FIG. 7 is a diagram schematically illustrating the view of FIG. 6 as viewed from above. Meanwhile, FIG. 7 illustrates the coil portion projected from the upper portion of FIG. 6 to reveal the structure of the coil portion more clearly.

Referring to FIGS. 1 to 5 and FIGS. 6 and 7, a coil component 2000 according to another embodiment of the present disclosure has a different shape of the lower patterns 221, 222, 223, and 224, compared to that of the coil component 1000 according to an embodiment of the present disclosure. Therefore, in describing this embodiment, only the shape of the lower patterns 221, 222, 223, and 224, different from that in the embodiment of the present disclosure will be described. For the remainder of the configuration of this embodiment, the description in the embodiment of the present disclosure may be applied as it is.

Referring to FIGS. 6 and 7, the lower patterns 221, 222, 223, and 224 according to another embodiment of the present disclosure may have a line width being increased or decreased from one end side to the other end side. As an example, the line width of the first lower pattern 221 may increase from one end side connected to the lower end portion of the via V2-1 to the other end side connected to the lower end portion of the via V1-2. The line width of the second lower pattern 222 may decrease from one end side connected to the lower end portion of the via V3-1 to the other end side connected to the lower end portion of the via V2-2. The line width of the third lower pattern 223 may increase from one end side connected to the lower end portion of the via V4-1 to the other end side connected to the lower end portion of the via V3-2. The line width of the fourth lower pattern 224 may decrease from one end side connected to the lower end portion of the via V5-1 to the other end side connected to the lower end portion of the via V4-2. Meanwhile, here, when a direction from one end side of the first lower pattern 221 toward the other end side of the first lower pattern 221 is defined as a line direction, the line width of the first lower pattern 221 may refer to a dimension of the first lower pattern in a direction perpendicular to the line direction. The same definitions may be applied to the line widths of the second to fourth lower patterns. In contrast, according to the embodiment shown in FIGS. 1 to 5, at least a portion of each of the lower patterns 221, 222, 223, and 224 may have substantially the same line width along the line direction. Herein, one or ordinary skill in the art would understand that the expression "substantially the same" or "substantially equal" refers to being the same by allowing process errors, positional deviations, and/or measurement errors that may occur in a manufacturing process.

As vias (V1-1, V2-1, V3-1, V4-1, V5-1, V1-2, V2-2, V3-2, V4-2, and V5-2) are arranged in the width direction W, the present embodiment may further have characteristics of increasing and decreasing line widths of the lower patterns 221, 222, 223, and 224, which connect the vias and are spaced apart from each other in the width direction W, in addition to the characteristics that a via having a tapered cross-section is adjacent to a via having an inverted tapered cross-section in the width direction W, as in the first embodiment of the present disclosure. For this reason, the coil component 2000 according to the present embodiment may increase a formation area of the lower patterns 221, 222, 223, and 224, based on the area of the lower surface of the same insulating substrate 110. As a result, it is possible to increase the conductor component disposed on the insulating substrate 110 having the same volume, thereby improving the direct current resistance characteristic (Rdc).

As set forth above, according to an embodiment of the present disclosure, it is possible to easily increase Q characteristics.

While the exemplary embodiments have been shown and described above, it will be apparent to those skilled in the art that modifications and variations could be made without departing from the scope of the present invention as defined by the appended claims.

What is claimed is:

1. A coil component, comprising:

a body including an insulating substrate having a first surface and a second surface opposing each other; and a coil portion disposed on the insulating substrate, wherein the coil portion comprises first and second upper patterns disposed on the first surface of the insulating substrate to be spaced apart from each other in a first direction, first and second lower patterns disposed on the second surface of the insulating substrate to be spaced apart from each other, and first and second vias each penetrating through the insulating substrate and disposed to be adjacent to each other in the first direction, wherein a cross-sectional area of an upper end portion of the first via in contact with the first upper pattern is smaller than a cross-sectional area of an upper end portion of the second via in contact with the second upper pattern, wherein a cross-sectional area of a lower end portion of the first via is greater than a cross-sectional area of a lower end portion of the second via, wherein the body further includes upper and lower cover layers disposed on the first and second surfaces of the insulating substrate, respectively, and side surface cover layers disposed on both side surfaces of the insulating substrate, respectively, opposing each other in the first direction, and wherein the upper and lower cover layers and the side surface cover layers include a material different from a material of the insulating substrate.

2. The coil component of claim 1, wherein a cross-sectional area of the upper end portion of the first via is smaller than a cross-sectional area of the lower end portion of the first via.

3. The coil component of claim 2, wherein a cross-sectional area of the first via increases from the upper end portion of the first via to the lower end portion of the first via.

4. The coil component of claim 2, wherein a cross-sectional area of the upper end portion of the second via is greater than a cross-sectional area of the lower end portion of the second via.

5. The coil component of claim 4, wherein a cross-sectional area of the second via decreases from the upper end portion of the second via to the lower end portion of the second via.

6. The coil component of claim 1, wherein a spacing distance between the upper end portion of the first via and the upper end portion of the second via is substantially equal to a spacing distance between the lower end portion of the first via and the lower end portion of the second via.

7. The coil component of claim 1, wherein the upper end portions of the first and second vias are in contact with first ends of the first and second upper patterns, respectively, wherein the lower end portion of the second via is in contact with a first end of the first lower pattern, wherein the coil portion further comprises a third via penetrating through the insulating substrate and connecting a second end of the first upper pattern and a second end of the first lower pattern, and wherein the third via has a cross-sectional area of an upper end portion, connected to the second end of the first upper pattern, smaller than a cross-sectional area of a lower end portion connected to the second end of the first lower pattern.

8. The coil component of claim 7, wherein the first lower pattern has a line width increasing from a first end side connected to the lower end portion of the second via to a second end side connected to the third via.

9. The coil component of claim 1, wherein the body has a first surface facing the second surface of the support substrate, and first and second end surfaces each connected to the first surface of the body and opposing each other in a second direction, perpendicular to the first direction, and wherein two end portions of the coil portion are exposed to the first end surface and the second end surface of the body, respectively.

10. The coil component of claim 9, further comprising first and second external electrodes disposed on the first surface of the body to be spaced apart from each other, and extending onto the first end surface and the second end surface of the body, respectively, to be connected to the two end portions of the coil portion, respectively.

11. The coil component of claim 1, wherein the insulating substrate includes at least one of an alumina ($Al_2O_3$) substrate, a glass substrate, or a resin substrate including a glass clothe.

12. A coil component, comprising:

a body including an insulating substrate having a first surface and a second surface opposing each other; and a coil portion disposed on the insulating substrate, wherein the coil portion comprises a plurality of upper patterns disposed on the first surface of the insulating substrate to be spaced apart from one another in a first direction, a plurality of lower patterns disposed on the second surface of the insulating substrate to be spaced apart from one another, and a plurality of vias penetrating through the insulating substrate and each having an upper end portion and a lower end portion that oppose each other, wherein the plurality of vias includes a via having a tapered cross-section and a via having an inverse tapered cross-section alternatively disposed in the first direction, wherein the body further includes upper and lower cover layers disposed on the first and second surfaces of the insulating substrate, respectively, and side surface cover layers disposed on both side surfaces of the insulating substrate, respectively, opposing each other in the first direction, and wherein the upper and lower cover layers and the side surface cover layers include a material different from a material of the insulating substrate.

13. The coil component of claim 12, wherein a cross-sectional area of the via having the tapered cross-section decreases from the upper end portion thereof to the lower end portion thereof, and wherein a cross-sectional area of the via having the inverse tapered cross-section increases from the upper end portion thereof to the lower end portion thereof.

14. The coil component of claim 12, wherein a spacing distance between the upper end portions of adjacent vias of the plurality of vias is substantially equal to a spacing distance between the lower end portions of the adjacent vias of the plurality of vias.

15. The coil component of claim 12, wherein the plurality of vias includes a plurality of first vias, respectively connected to first ends of the plurality of upper patterns, and a plurality of second vias, respectively connected to second ends of the plurality of upper patterns opposing the first ends of the upper patterns, and wherein at least some of the lower end portions of the first vias are connected to first ends of the plurality of lower patterns, and at least some of the lower end portions of the second vias are connected to second ends of the plurality of lower patterns opposing the first ends of the lower patterns.

16. The coil component of claim 15, further comprising a first lead-out pattern to which one of the lower end portions of the first vias is connected, and a second lead-out pattern to which one of the lower end portions of the second vias is connected.

17. The coil component of claim 16, further comprising first and second external electrodes disposed on external surfaces of the body and connected to the first and second lead-out patterns, respectively, such that the first lead-out pattern, the first and second vias, the plurality of upper and lower patterns, and the second lead-out pattern are connected as a single coil connected in series between the first and second external electrodes.

18. The coil component of claim 12, wherein at least a portion of each of the plurality of lower patterns has substantially the same line width along a direction in which two ends of each of the plurality of lower patterns oppose.

19. The coil component of claim 12, wherein at least a portion of each of the plurality of lower patterns has an increasing or decreasing line width.

20. A coil component, comprising:

a body including an insulating substrate having a first surface and a second surface opposing each other; and a coil portion disposed on the insulating substrate, wherein the coil portion comprises first and second upper patterns disposed on the first surface of the insulating substrate to be spaced apart from each other in a first direction, first and second lower patterns disposed on the second surface of the insulating substrate to be spaced apart from each other, and first and second vias each penetrating through the insulating substrate and disposed to be adjacent to each other in the first direction, wherein a cross-sectional area of an upper end portion of the first via in contact with the first upper pattern is smaller than a cross-sectional area of an upper end portion of the second via in contact with the second upper pattern, wherein a cross-sectional area of the upper end portion of the first via is smaller than a cross-sectional area of the lower end portion of the first via, wherein the body further includes upper and lower cover layers disposed on the first and second surfaces of the insulating substrate, respectively, and side surface cover layers disposed on both side surfaces of the insulating substrate, respectively, opposing each other in the first direction, and wherein the upper and lower cover layers and the side surface cover layers include a material different from a material of the insulating substrate.

* * * * *